Feb. 27, 1951     J. H. STARK ET AL     2,543,647

BEARING STRUCTURE

Filed March 18, 1949

Inventors:
Julian H. Stark,
Wade E. Tyler,
by *Prowell S. Mack*
Their Attorney

Patented Feb. 27, 1951

2,543,647

UNITED STATES PATENT OFFICE 2,543,647

BEARING STRUCTURE

Julian H. Stark, Fort Wayne, and Wade E. Tyler, Hoagland, Ind., assignors to General Electric Company, a corporation of New York Application March 18, 1949, Serial No. 82,252

1 Claim. (Cl. 308—184)

Our invention relates to an improved bearing structure for the support of a rotatable shaft and, more particularly to a bearing structure including an anti-friction bearing and a resilient mounting component which is useful in applications such as small dynamoelectric machines.

By the term "anti-friction bearing" in this specification we mean a bearing of a type such as a ball-bearing, a roller bearing or a needle bearing having an inner race and an outer race and rolling elements therebetween.

In the usual construction of machines using anti-friction bearings, the bearings must be fitted very carefully, with small tolerances, into the bearing supporting frame of the machine. If any appreciable radial clearance is allowed between the outer race of the anti-friction bearing and the mounting frame, the outer race will rotate and vibrate causing excessive wear in the bearing itself.

When the bearings are fitted closely there can be very little self-adjustment for the axial alignment of the bearings. Therefore the axial alignment of the bearing, as it is fitted, is also critical. In the conventional construction, therefore, because of the close fit and the critical axial alignment required, the installation of anti-friction bearings is a laborious and expensive operation. An object of our invention, is therefore, to eliminate these expensive and laborious fitting operations in the installation of anti-friction bearings.

This is accomplished by the use of a resilient plastic liner between the outer race of the anti-friction bearing and the bearing supporting frame opening. When such a liner is used, the problem presents itself as to how to assemble the bearing and properly compress the resilient plastic liner to take up the variations in the dimensional tolerances between the parts and make the bearing tight. It is therefore a further object of our invention to provide a structure which allows an expeditious and inexpensive assembly of the parts of a bearing structure including a resilient plastic liner.

Our invention therefore consists of a bearing structure involving the use of an anti-friction bearing and a mounting therefor including a resilient plastic material and a retaining member for said material to avoid unwanted deformation thereof as the bearing is assembled.

Figure 1:
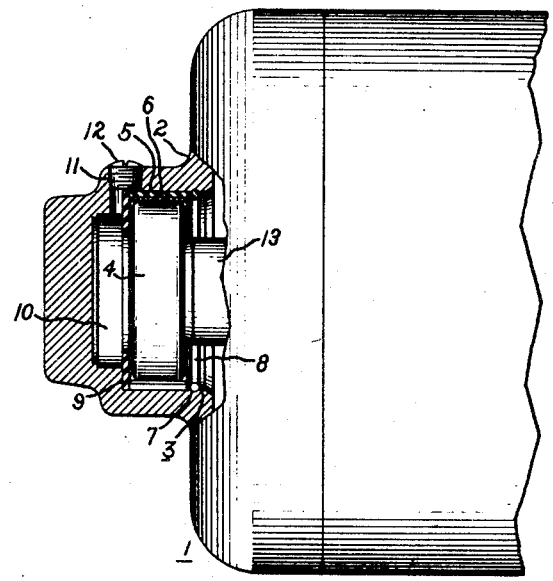
Figure 2:
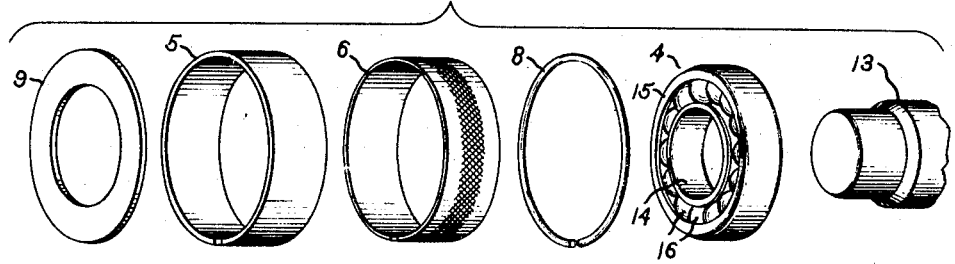

Our invention will be more completely understood by reference to the accompanying drawings and the following specification wherein Fig. 1 is a side view, partly in section, of a preferred embodiment of our invention as incorporated in one end of a small dynamo-electric machine and Fig. 2 is an exploded view of the components which are assembled into the supporting frame opening to constitute our bearing structure.

Referring to Fig. 1, a small dynamo-electric machine incorporating the bearing construction of our invention is designated as a whole as 1 with an end shield 2 forming a bearing housing with a cylindrical opening 3 therein. In this opening 3 the remaining components of my bearing structure are positioned. An anti-friction bearing 4 is used which is of a diameter appreciably smaller than the diameter of opening 3 in end shield 2. The space around the bearing in the opening 3 is filled with a resilient plastic liner 5, and a ring 6 of metallic material such as steel, which is split at one point in its circumference to allow expansion outwardly to compress the resilient plastic liner. The resilient plastic liner 5 is preferably of a synthetic rubber-like material, such as neoprene, and which does not deteriorate in the presence of lubricants. There is a circumferential groove in the end shield 2 at 7 in which a split circular snap ring 8 is retained by its own radial outward force. This spring extends radially inwardly from the walls of the cylindrical opening 3 to act as a stop to retain the resilient plastic liner 5 against movement to the right in the drawing of Fig. 1, and out of its proper position. A flat washer 9, of resilient plastic material similar to that used for resilient plastic liner 5, is provided at the left of bearing 4 to restrain end movement of the bearing to the left in Fig. 1. Chamber 10 is a lubricant reservoir for bearing 4, with lubricant filling opening 11 which is closed by plug 12. The shaft 13 to be supported fits within bearing 4.

Fig. 2 shows an exploded view of the components mentioned above which are positioned in opening 3 of end shield 2 to comprise our bearing construction. Bearing 4 is here shown in greater detail, disclosing the inner race 14, the outer race 15 and the rotatable elements 16 therebetween. The shaft 13 is preferably press-fitted into the inner race 14. While resilient liner 5 is shown as a flat strip formed into a cylindrical split ring, it will be readily understood that said liner may be formed as a continuous ring.

In the assembly of the embodiment of our bearing construction shown in Fig. 1, the components may be inserted in cylindrical opening 3 in end shield 2 in the order indicated from left to right in Fig. 2, that is, flat washer 9 first, then resilient plastic liner 5, split lining ring 6, split snap ring 8 and finally, bearing 4 and shaft 13 which have previously been press-fitted together. Bearing 4 may be assembled after spit snap ring 8 because the snap ring 8 does not extend radially inwardly into the opening 3 to a diameter smaller than the outside diameter of bearing 4.

Before bearing 4 is inserted, split lining ring 6 holds the liner 5 outwardly against the wall of cylindrical opening 3. In its unexpanded condition, the split lining ring 6 has an inner diameter which is slightly less than the outer diameter of anti-friction bearing 4, so that as bearing 4 is inserted into the split lining ring 6 the lining ring must expand radially outwardly to a greater circumference, thus compressing the resilient plastic liner 5. Bearing 4 is thereby held resiliently but securely against radial movement. The split lining ring 6 has a relatively smooth inner surface, and by sliding on this surface, bearing 4 may be expeditiously assembled into the split lining ring. The ring also stiffens and retains the resilient plastic liner 5 in its desired position as it is compressed by the insertion of bearing 4, where otherwise, without the use of the split lining ring, the resilient plastic liner would not remain in its proper position, but would be pushed into the bottom of opening 3 (to the left in Fig. 1).

The resilient plastic liner 5 may be compressed over relatively wide limits in the process of assembly and still securely hold bearing 4. The dimensional tolerances on the inside diameter of cylindrical opening 3 and the outside diameter of bearing 4 therefore may vary over a wide range without impairing the efficiency or utility of our bearing structure. Also the axial alignment of opening 3 in end shield 2 is not critical, for by means of deformation of the resilient plastic liner, our bearing structure is self-aligning.

Thus, our invention allows the use of wide dimensional tolerances in the size and axial alignment of opening 3 in end shield 2, eliminating many machining and fitting operations which are necessary with a conventional construction. At the same time our bearing structure can be assembled quickly because of the use of split lining ring 6.

When a dynamically unbalanced load is supported on our bearing structure, the slight radial movements which result may cause the resilient plastic liner 5 to move away from its intended position under split lining ring 6. Split snap ring 8 is therefore provided as a safeguard to assure the retention of the plastic liner in that position. However, the resilient plastic liner 5 may be bonded to the split lining ring 6. When this construction is used, split snap ring 8 may not be required.

Accordingly, while we have described and illustrated this preferred embodiment of our invention, it should be understood that we do not intend to be restricted solely thereto but that we intend to cover all modifications thereof which would be apparent to one skilled in the art and which come within the spirit and scope of our invention.

What we claim as new and desire to secure by Letters Patent of the United Sttaes is:

In a support for a rotatable shaft including a frame with a cylindrical opening therein and a circumferential groove in the inner surface of said opening, a resilient plastic liner within said opening and axially spaced from said circumferential groove, a split snap ring retained in said circumferential groove by its own spring force but protruding radially inwardly into said cylindrical opening and thereby forming a stop to limit axial movement of said resilient plastic liner, a split metallic lining ring within said plastic liner, said ring being expandable when subjected to outward radial pressure to thereby compress said liner, an anti-friction bearing within said lining ring including an inner race to receive the rotatable shaft to be supported and an outer race having an outer diameter larger than the unexpanded inner diameter of the split lining ring so that said lining ring is expanded when in assembled relationship with the anti-friction bearing.

JULIAN H. STARK.
WADE E. TYLER.

REFERENCES CITED

The following references are of record in the file of this patent:

UNITED STATES PATENTS

| Number | Name | Date |
|---|---|---|
| 2,173,250 | Fay | Sept. 19, 1939 |
| 2,201,477 | Chamberlain | May 21, 1940 |

FOREIGN PATENTS

| Number | Country | Date |
|---|---|---|
| 525,432 | Great Britain | Aug. 28, 1940 |